United States Patent
Zhao et al.

(10) Patent No.: US 9,436,243 B2
(45) Date of Patent: Sep. 6, 2016

(54) CIRCUIT BOARD AND POWER SOURCE MANAGEMENT SYSTEM OF CIRCUIT BOARD

(71) Applicant: NVIDIA CORPORATION, Santa Clara, CA (US)

(72) Inventors: Yu Zhao, Shenzhen (CN); Fei Wang, Guangzhou (CN); Xiang Sun, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 32 days.

(21) Appl. No.: 13/791,099

(22) Filed: Mar. 8, 2013

(65) Prior Publication Data

US 2014/0132235 A1    May 15, 2014

(30) Foreign Application Priority Data

Nov. 9, 2012 (CN) .......................... 2012 1 0449242

(51) Int. Cl.
*G05F 1/46* (2006.01)
*G05F 1/575* (2006.01)
*G06F 1/26* (2006.01)
*H02M 3/158* (2006.01)
*H02M 1/00* (2006.01)

(52) U.S. Cl.
CPC .............. *G06F 1/26* (2013.01); *H02M 3/1584* (2013.01); *H02M 2001/0025* (2013.01)

(58) Field of Classification Search
None
See application file for complete search history.

(56) References Cited

U.S. PATENT DOCUMENTS

| 7,138,815 B1* | 11/2006 | Alexander et al. ........ 324/750.3 |
| 2005/0286269 A1* | 12/2005 | Groom ............................ 363/16 |
| 2008/0238392 A1* | 10/2008 | Cheung et al. ............... 323/283 |

* cited by examiner

*Primary Examiner* — Timothy J Dole
*Assistant Examiner* — Monica Mata
(74) *Attorney, Agent, or Firm* — Artegis Law Group, LLP

(57) ABSTRACT

A power source management system of a circuit board that comprises: a processor, comprising a core voltage input terminal; and a core voltage feedback terminal; and a voltage regulating member, comprising a setting terminal with a fixed reference voltage provided thereto; a detecting terminal connected to the core voltage feedback terminal to detect a feedback core voltage from the core voltage feedback terminal; and a core voltage output terminal connected to the core voltage input terminal to provide a core voltage thereto, wherein the core voltage is regulated by the voltage regulating member based on the feedback core voltage, such that the feedback core voltage is equal to the fixed reference voltage, wherein an offset voltage equal to a difference between a desired core voltage of the processor and the fixed reference voltage is provided between the core voltage input terminal and the core voltage feedback terminal by the processor.

19 Claims, 1 Drawing Sheet

CIRCUIT BOARD AND POWER SOURCE MANAGEMENT SYSTEM OF CIRCUIT BOARD

CROSS-REFERENCE TO RELATED APPLICATIONS

This application claims priority to Chinese Patent Application No. 201210449242.X, filed on Nov. 9, 2012, which is hereby incorporated herein by reference.

BACKGROUND OF THE INVENTION

1. Field of the Invention

The present invention relates generally to the art of electronic devices and, in particular, to a circuit board and a power source management system of a circuit board.

2. Description of the Related Art

The technology of Dynamic Voltage and Frequency Scaling (DVFS) is often used in a circuit board of an electronic device, such as a microcomputer, to improve system performance and decrease system power consumption. Specifically, the processor of the circuit board (such as a GPU of a graphics card) forecasts the performance that the system will require during the following period based on the current load, thus determines a required frequency and calculates a new voltage based on the new frequency. The processor informs the voltage regulating member so that the new voltage is provided to the processor from the voltage regulating member. The frequency regulation is performed by the processor itself, while for the voltage regulation, it is required that the processor provides a signal related to a desired core voltage to the voltage regulating member, and the voltage regulating member provides a core voltage to the processor based on the signal.

Specially, taking a GPU as an example, as shown in FIG. 1, a GPU 1' is connected with a voltage regulating member 2' via a parallel bus or a serial bus. The GPU 1' outputs a signal related to a desired core voltage to the voltage regulating member 2' through the bus connection. The reference voltage setting module 26' of the voltage regulating member receives the signal, converts it to the desired core voltage Vn of the GPU and outputs it to the controller 24' of the voltage regulating member. The setting terminal of the controller receive the above mentioned desired core voltage Vn, while the detecting terminal of the controller receive the core voltage Vc of the GPU to form a closed-loop control. The controller adjusts the output voltage Vcc based on the desired core voltage Vn and the core voltage Vc received by the detecting terminal until the core voltage Vc is equal to the desired core voltage Vn.

Since a parallel bus or a serial bus is required for the connection between the processor and the voltage regulating member, the complexity of the circuit board is increased. Meanwhile, the time for closed-loop regulation of the core voltage of the processor is extended because of the bus communication, thus the transient performance of the system is hard to be improved.

Therefore, there is a need of providing a circuit board and a power source management system of a circuit board to solve the above problem in the prior art.

SUMMARY OF THE INVENTION

In order to solve the above problem, in accordance with one aspect of the present invention, a power source management system of a circuit board is provided which comprises: a processor, comprising a core voltage input terminal; and a core voltage feedback terminal; and a voltage regulating member, comprising a setting terminal with a fixed reference voltage provided thereto; a detecting terminal connected to the core voltage feedback terminal to detect a feedback core voltage from the core voltage feedback terminal; and a core voltage output terminal connected to the core voltage input terminal to provide a core voltage thereto, wherein the core voltage is regulated by the voltage regulating member based on the feedback core voltage, such that the feedback core voltage is equal to the fixed reference voltage, wherein an offset voltage equal to a difference between a desired core voltage of the processor and the fixed reference voltage is provided between the core voltage input terminal and the core voltage feedback terminal by the processor.

Preferably, the processor comprises a voltage offset circuit, wherein two offset voltage output terminals of the voltage offset circuit are connected to the core voltage input terminal and the core voltage feedback terminal respectively, such that the offset voltage is provided between them.

Preferably, a reference voltage source is provided in the voltage regulating member, with an output terminal of the reference voltage source providing the fixed reference voltage to the setting terminal.

Preferably, the voltage regulating member comprises: a controller, with the setting terminal and the detecting terminal connected thereto respectively, wherein a plurality of PWM signals are output from the controller based on the fixed reference voltage and the feedback core voltage; and a multiphase power generating circuit connected to the controller, wherein the multiphase power generating circuit includes multiple BUCK circuits in parallel connection, with each BUCK circuit receiving one of the plurality of PWM signals; and the core voltage output terminal is formed by a common output terminal of the multiple BUCK circuits in parallel connection.

Preferably, a capacitor is provided between the core voltage output terminal and the ground.

Preferably, the processor is a graphics processing unit, a CPU or a digital signal processor.

Preferably, the processor determines the load thereof, and determines the desired core voltage of the processor based on the load.

Preferably, the core voltage input terminal is connected to the core voltage output terminal via a copper wire; and the core voltage feedback terminal is connected to the detecting terminal via a copper wire.

Preferably, the core voltage is increased by the voltage regulating member when the feedback core voltage is lower than the fixed reference voltage, and decreased by the voltage regulating member when the feedback core voltage is higher than the fixed reference voltage.

In accordance with one aspect of the present invention, a circuit board is provided which comprises a power source management system, the power source management system comprises: a processor, comprising a core voltage input terminal; and a core voltage feedback terminal; and a voltage regulating member, comprising a setting terminal with a fixed reference voltage provided thereto; a detecting terminal connected to the core voltage feedback terminal to detect a feedback core voltage from the core voltage feedback terminal; and a core voltage output terminal connected to the core voltage input terminal to provide a core voltage thereto, wherein the core voltage is regulated by the voltage regulating member based on the feedback core voltage, such that the feedback core voltage is equal to the fixed reference voltage, wherein an offset voltage equal to a difference between a desired core voltage of the processor and the fixed reference voltage is provided between the core voltage input terminal and the core voltage feedback terminal by the processor.

Preferably, the processor comprises a voltage offset circuit, wherein two offset voltage output terminals of the voltage offset circuit are connected to the core voltage input terminal and the core voltage feedback terminal respectively, such that the offset voltage is provided between them.

Preferably, a reference voltage source is provided in the voltage regulating member, with an output terminal of the reference voltage source providing the fixed reference voltage to the setting terminal.

Preferably, the voltage regulating member comprises: a controller, with the setting terminal and the detecting terminal connected thereto respectively, wherein a plurality of PWM signals are output from the controller based on the fixed reference voltage and the feedback core voltage; and a multiphase power generating circuit connected to the controller, wherein the multiphase power generating circuit includes multiple BUCK circuits in parallel connection, with each BUCK circuit receiving one of the plurality of PWM signals; and the core voltage output terminal is formed by a common output terminal of the multiple BUCK circuits in parallel connection.

Preferably, a capacitor is provided between the core voltage output terminal and the ground.

Preferably, the processor is a graphics processing unit, a CPU or a digital signal processor.

Preferably, the processor determines the load thereof, and determines the desired core voltage of the processor based on the load.

Preferably, the core voltage input terminal is connected to the core voltage output terminal via a copper wire; and the core voltage feedback terminal is connected to the detecting terminal via a copper wire.

Preferably, the core voltage is decreased by the voltage regulating member when the feedback core voltage is higher than the fixed reference voltage, and increased by the voltage regulating member when the feedback core voltage is lower than the fixed reference voltage.

Preferably, the circuit board is a graphics card.

Following are the effectiveness of the present invention:

In the power source management system of a circuit board of the invention, a fixed reference voltage rather than the desired core voltage is provided to the setting terminal of the regulating member, and the processor is provided with a core voltage input terminal and a core voltage feedback terminal, with the core voltage feedback terminal connected to the detecting terminal of the voltage regulating member. An offset voltage equal to a difference between a desired core voltage of the processor and the fixed reference voltage is provided between the core voltage input terminal and the core voltage feedback terminal by the processor. Meanwhile, the voltage regulating member always regulates the output voltage at the core voltage output terminal thereof, taking the fixed reference voltage as a target value and the feedback core voltage at the core voltage feedback terminal as a detected value, such that the core voltage at the core voltage input terminal of the processor is regulated.

Thus, when the desired voltage is equal to the fixed reference voltage, the offset voltage will be set to 0V, and the voltage regulating member regulates the output voltage (so that the core voltage at the core voltage input terminal of the processor is regulated) until the detected feedback core voltage is equal to the fixed reference voltage. When it is required to increase the core voltage, the offset voltage is regulated by the processor to be equal to the difference between a desired core voltage of the processor and the fixed reference voltage, then the feedback core voltage is decreased by an amount equal to the difference between the desired core voltage and the fixed reference voltage. Because of the reduction of the feedback core voltage, the voltage regulating member will increase the output voltage thereof, so that the core voltage will be increased, until the feedback core voltage is increased by an amount equal to the difference between the desired core voltage and the fixed reference voltage (so that the core voltage is also increased by an amount equal to the difference between the desired core voltage and the fixed reference voltage). Then the core voltage reaches the desired core voltage. Similarly, when it is required to decrease the core voltage, the core voltage can also reach the desired core voltage by the above mentioned method.

It will be understand that since the fixed reference voltage rather than the desired core voltage is provided to the setting terminal of the regulating member, and an offset voltage is provided in the processor based on the desired core voltage, which causes the core voltage output from the voltage regulating member to be changed, the part which processes the voltage regulation is moved from the voltage regulating member into the processor in the power source management system of the present invention. So that the communication bus between the processor and the voltage regulating member is not needed, and the complexity of the circuit board is decreased. Meanwhile, the time for closed-loop regulation of the core voltage of the processor is greatly shortened, with the transient performance of the system improved because no bus communication is needed between the processor and the voltage regulating member.

A serial of simplified conceptions are incorporated into the summary of the invention, which will be further described in more detail in the detailed description. The summary of the invention neither implies that it is intended to limit the essential features and necessary technical features of the technical solution to be protected, nor implies that it is intended to define the protection scope of the technical solution to be protected.

Advantages and features of the present invention will be described in detail below in connection with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Figure 1:
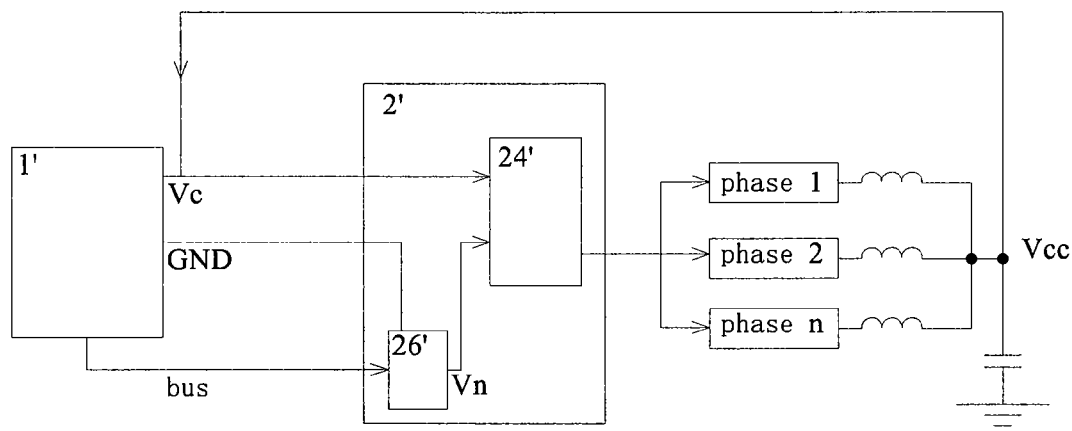
FIG. 1 is a schematic view of the connection relationship in the power source management system of a circuit board in the prior art.
Figure 2:
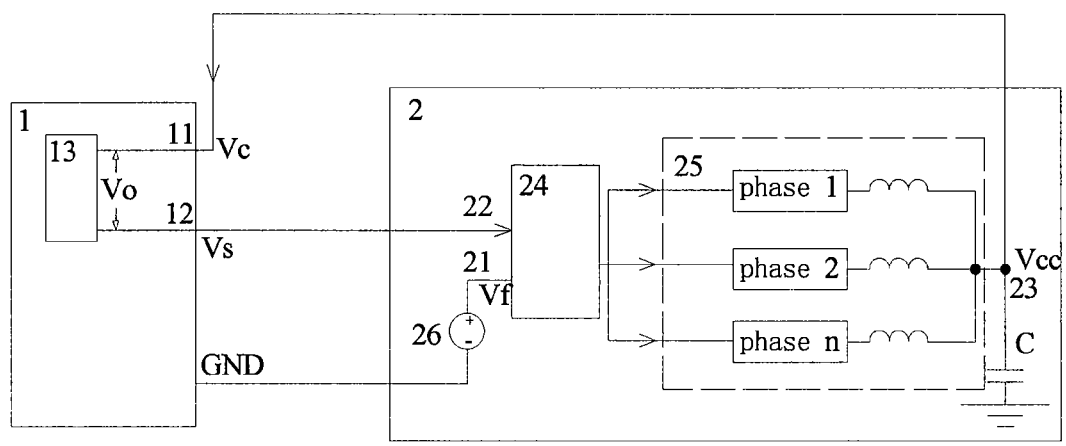
FIG. 2 is a schematic view of the connection relationship in the power source management system of a circuit board in accordance with the embodiment of the present invention.

As shown in FIG. 2, the power source management system of a circuit board according to the embodiment of the invention comprises a processor 1 and a voltage regulating member 2. The processor 1 comprises a core voltage input terminal 11 and a core voltage feedback terminal 12. The voltage regulating member 2 comprises a setting terminal 21, a detecting terminal 22 and a core voltage output terminal 23. A fixed reference voltage Vf is provided to the setting terminal 21. The detecting terminal 22 is connected to the core voltage feedback terminal 12 to detect a feedback core voltage Vs from the core voltage feedback terminal 12. The core voltage output terminal 23 is connected to the core voltage input terminal 11 of the processor 1 to provide a core voltage Vc thereto (The output voltage Vcc at the core voltage output terminal 23 is slightly different from the core voltage Vc received by the core voltage input terminal 11 of the processor 1 because of the influence of factors such as the resistance of connection wire, etc.). Wherein, the output voltage Vc is regulated by the voltage regulating member 2 based on the feedback core voltage Vs, and then the core voltage is regulated, such that the feedback core voltage Vs is equal to the fixed reference voltage Vf. That is, the output voltage Vc is regulated by the voltage regulating member 2, and then the core voltage is regulated, and the output voltage Vcc and the core voltage Vc are regulated until the feedback core voltage Vs is equal to the fixed reference voltage Vf. The core voltage Vc is increased by the voltage regulating member 2 when the feedback core voltage Vs is lower than the fixed reference voltage Vf, and decreased by the voltage regulating member 2 when the feedback core voltage Vs is higher than the fixed reference voltage Vf. An offset voltage Vo equal to the difference between a desired core voltage Vn of the processor 1 and the fixed reference voltage Vf is provided between the core voltage input terminal 11 and the core voltage feedback terminal 12 by the processor 1. It will be understand that the feedback core voltage Vs=Vc−Vo.

In the power source management system of a circuit board of the invention, a fixed reference voltage Vf rather than the desired core voltage is provided to the setting terminal 21 of the regulating member 2, and an offset voltage Vo equal to the difference between a desired core voltage Vn of the processor 1 and the fixed reference voltage Vf is provided between the core voltage input terminal 11 and the core voltage feedback terminal 12 by the processor 1. Meanwhile, the voltage regulating member 2 always regulates the output voltage Vcc at the core voltage output terminal 23 thereof, taking the fixed reference voltage Vf as a target value and the feedback core voltage Vs at the core voltage feedback terminal 12 as a detected value, such that the core voltage Vc at the core voltage input terminal 11 of the processor 1 is regulated.

Thus, when the desired voltage Vn is equal to the fixed reference voltage Vf, the offset voltage Vo will be set to 0V, so Vs=Vc, and the voltage received by the detecting terminal 22 of the voltage regulating member 2 is the core voltage Vc. The voltage regulating member 2 regulates the output voltage Vcc (so that the core voltage Vc is regulated) until the detected feedback core voltage Vs is equal to the fixed reference voltage Vf. When it is required to increase the core voltage Vc, the offset voltage Vo is regulated by the processor 1 to be equal to the difference between a desired core voltage Vn of the processor 1 and the fixed reference voltage Vf (Vo=Vn−Vf), then the feedback core voltage Vs is decreased by an amount equal to the difference between the desired core voltage Vn and the fixed reference voltage Vf (i.e., Vn−Vf). Because of the reduction of the feedback core voltage Vs, the voltage regulating member 2 will increase the output voltage Vcc thereof, so that the core voltage Vc will be increased, until the feedback core voltage Vs is increased by an amount equal to Vn−Vf (so that the core voltage Vc is also increased by an amount equal to Vn−Vf). Then the core voltage Vc reaches the desired core voltage Vn. Similarly, when it is required to decrease the core voltage Vc, the core voltage Vc can also reach the desired core voltage Vn by the above mentioned method.

It will be understood that since the fixed reference voltage Vf rather than the desired core voltage Vn is provided to the setting terminal 21 of the regulating member 2, and an offset voltage Vo is provided in the processor 1 based on the desired core voltage Vn, which causes the output voltage Vcc of the voltage regulating member, and thus the core voltage Vcc to be changed, the part which processes the voltage regulation is moved from the voltage regulating member 2 into the processor 1 in the power source management system of the present invention. So that the communication bus between the processor and the voltage regulating member is not needed, and the complexity of the circuit board is decreased. Meanwhile, the time for closed-loop regulation of the core voltage of the processor 1 is greatly shortened, with the transient performance of the system improved because no bus communication is needed between the processor 1 and the voltage regulating member 2.

The offset voltage Vo can be applied through a variety of ways. Preferably, in the present embodiment, the processor 1 comprises a voltage offset circuit 13, with two offset voltage output terminals of the voltage offset circuit 13 connected to the core voltage input terminal 11 and the core voltage feedback terminal 12 respectively, such that the offset voltage Vo is provided between them. The processor 1 can regulate the offset voltage Vo by controlling the voltage output from the offset circuit 13.

The fixed reference voltage Vf may be provided to the setting terminal 21 of the voltage regulating member 2 from an external power source. Preferably, a reference voltage source 26 is provided in the voltage regulating member 2, with an output terminal of the reference voltage source 26 providing the fixed reference voltage Vf to the setting terminal 21.

The voltage regulating member 2 can have any structure with the above mentioned function of outputting voltage. Preferably, in the present embodiment, as shown in FIG. 2, the voltage regulating member 2 comprises a controller 24 and a multiphase power generating circuit 25. Wherein, the above mentioned setting terminal 21 and the above mentioned detecting terminal 22 are connected to the controller 24 respectively. A plurality of PWM signals corresponding to the output voltage Vcc are output from the controller 24 based on the fixed reference voltage Vf from the setting terminal 21 and the feedback core voltage Vs from the detecting terminal 22. The multiphase power generating circuit 25 is connected to the controller 24. The multiphase power generating circuit 25 includes multiple BUCK circuits in parallel connection, with each BUCK circuit receiving one of the plurality of PWM signals. The above mentioned core voltage output terminal 23 for outputting the above mentioned output voltage Vcc is formed by a common output terminal of the multiple BUCK circuits in parallel connection. The structure of the voltage regulating member 2 is simple and the output voltage of the voltage regulating member 2 is stable.

More preferably, a capacitor C is provided between the core voltage output terminal 23 and the ground for filtering the output voltage Vcc, so that the output voltage Vcc is more precise.

The processor 1 of the present embodiment is a graphics processing unit. But in practice, the processor 1 can be any other type of suitable processor, such as a CPU or a digital signal processor. Moreover, the processor 1 determines the load thereof, and determines the desired core voltage Vn of the processor 1 based on the load.

In addition, any suitable connection manner can be employed for connecting the core voltage input terminal 11 to the core voltage core voltage output terminal 23 and connecting the core voltage feedback terminal 12 and the detecting terminal 22. Preferably, the core voltage input terminal 11 is connected to the core voltage output terminal 23 via a copper wire, and the core voltage feedback terminal 12 is connected to the detecting terminal 22 via a copper wire.

In accordance with another aspect of the present invention, a circuit board is further provided which may comprise any type of the power source management system as mentioned above. The properties and features of all the components as well as the connection relationship among them in the power source management system have been described previously and will not be described in detail here.

The part which processes the voltage regulation is moved from the voltage regulating member 2 to the processor 1 in the power source management system of the circuit board of the present invention. So that the communication bus between the processor and the voltage regulating member is not needed, and the complexity of the circuit board is decreased. Meanwhile, the time for closed-loop regulation of the core voltage of the processor 1 is greatly shortened, with the transient performance of the system improved because no bus communication is needed between the processor 1 and the voltage regulating member 2.

The circuit board can be any type of circuit board with any function which comprises the above mentioned power source management system. Preferably, in the present embodiment, the circuit board is a graphics card.

The present invention has been described by the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

The invention claimed is:

1. A power source management system of a circuit board, comprising:
   a processor that includes:
      a voltage offset circuit having a first offset voltage output terminal and a second offset voltage output terminal,
      a core voltage input terminal coupled to the first offset voltage output terminal, and
      a core voltage feedback terminal coupled to the second offset voltage output terminal; and
   a voltage regulating means that is separate from the processor and includes:
      a controller,
      a setting terminal connected to the controller with a fixed reference voltage provided thereto,
      a detecting terminal connected to the controller and coupled to the core voltage feedback terminal to detect a feedback core voltage from the core voltage feedback terminal, and
      a core voltage output terminal coupled to the core voltage input terminal to provide a core voltage thereto, wherein the core voltage output terminal and the core voltage input terminal are separate terminals,
   wherein the core voltage is regulated by the voltage regulating means based on the feedback core voltage, such that the feedback core voltage is equal to the fixed reference voltage,
   wherein an offset voltage equal to a difference between a desired core voltage of the processor and the fixed reference voltage is provided between the core voltage input terminal and the core voltage feedback terminal by the processor.

2. The power source management system of claim 1, wherein the
   the offset voltage is further provided between the first offset voltage output terminal and the second offset voltage output terminal.

3. The power source management system of claim 1, wherein a reference voltage source is provided in the voltage regulating means, with an output terminal of the reference voltage source providing the fixed reference voltage to the setting terminal.

4. The power source management system of claim 1, wherein a plurality of PWM signals are output from the controller based on the fixed reference voltage and the feedback core voltage, the voltage regulating means further includes
   a multiphase power generating circuit connected to the controller, wherein the multiphase power generating circuit includes multiple BUCK circuits in parallel connection, with each BUCK circuit receiving one of the plurality of PWM signals, and
   the core voltage output terminal is formed by a common output terminal of the multiple BUCK circuits in parallel connection.

5. The power source management system of claim 4, wherein a capacitor is provided between the core voltage output terminal and the ground.

6. The power source management system of claim 1, wherein the processor comprises i& a graphics processing unit, a CPU or a digital signal processor.

7. The power source management system of claim 1, wherein the processor determines the load thereof, and determines the desired core voltage of the processor based on the load.

8. The power source management system of claim 1, wherein
   the core voltage input terminal is connected to the core voltage output terminal via a copper wire; and
   the core voltage feedback terminal is connected to the detecting terminal via a copper wire.

9. The power source management system of claim 1, wherein the core voltage is increased by the voltage regulating means when the feedback core voltage is lower than the fixed reference voltage, and decreased by the voltage regulating means when the feedback core voltage is higher than the fixed reference voltage.

10. A circuit board, comprising:
a power source management system that includes:
- a processor that includes:
  - a voltage offset circuit having a first offset voltage output terminal and a second offset voltage output terminal,
  - a core voltage input terminal coupled to the first offset voltage output terminal, and
  - a core voltage feedback terminal coupled to the second offset voltage output terminal; and
- a voltage regulating means that is separate from the processor and includes:
  - a controller,
  - a setting terminal connected to the controller with a fixed reference voltage provided thereto,
  - a detecting terminal connected to the controller and coupled to the core voltage feedback terminal to detect a feedback core voltage from the core voltage feedback terminal, and
  - a core voltage output terminal coupled to the core voltage input terminal to provide a core voltage thereto, wherein the core voltage output terminal and the core voltage input terminal are separate terminals,
- wherein the core voltage is regulated by the voltage regulating means based on the feedback core voltage, such that the feedback core voltage is equal to the fixed reference voltage,
- wherein an offset voltage equal to a difference between a desired core voltage of the processor and the fixed reference voltage is provided between the core voltage input terminal and the core voltage feedback terminal by the processor.

11. The circuit board of claim 10, wherein the the offset voltage is further provided between the first offset voltage output terminal and the second offset voltage output terminal.

12. The circuit board of claim 10, wherein a reference voltage source is provided in the voltage regulating means, with an output terminal of the reference voltage source providing the fixed reference voltage to the setting terminal.

13. The circuit board of claim 10, wherein a plurality of PWM signals are output from the controller based on the fixed reference voltage and the feedback core voltage, the voltage regulating means further includes
- a multiphase power generating circuit connected to the controller, wherein the multiphase power generating circuit includes multiple BUCK circuits in parallel connection, with each BUCK circuit receiving one of the plurality of PWM signals, and
- the core voltage output terminal is formed by a common output terminal of the multiple BUCK circuits in parallel connection.

14. The circuit board of claim 13, wherein a capacitor is provided between the core voltage output terminal and the ground.

15. The circuit board of claim 10, wherein the processor comprises a graphics processing unit, a CPU or a digital signal processor.

16. The circuit board of claim 10, wherein the processor determines the load thereof, and determines the desired core voltage of the processor based on the load.

17. The circuit board of claim 10, wherein
- the core voltage input terminal is connected to the core voltage output terminal via a copper wire; and
- the core voltage feedback terminal is connected to the detecting terminal via a copper wire.

18. The circuit board of claim 10, wherein the core voltage is decreased by the voltage regulating means when the feedback core voltage is higher than the fixed reference voltage, and increased by the voltage regulating means when the feedback core voltage is lower than the fixed reference voltage.

19. The circuit board of claim 10, wherein the circuit board comprises a graphics card.

* * * * *

UNITED STATES PATENT AND TRADEMARK OFFICE
CERTIFICATE OF CORRECTION

PATENT NO. : 9,436,243 B2
APPLICATION NO. : 13/791099
DATED : September 6, 2016
INVENTOR(S) : Yu Zhao et al.

Page 1 of 1

It is certified that error appears in the above-identified patent and that said Letters Patent is hereby corrected as shown below:

In the Claims

Column 8, Claim 2, Line 25, please delete "the" before offset;

Column 8, Claim 6, Line 50, please delete "i&";

Column 9, Claim 11, Line 34, please delete "the" before offset.

Signed and Sealed this
Tenth Day of January, 2017

Michelle K. Lee
*Director of the United States Patent and Trademark Office*